Nov. 23, 1948.  G. W. ODELL  2,454,711
MEANS FOR USE IN COMPUTING ELAPSED TIME AND THE LIKE
Filed April 21, 1943  5 Sheets-Sheet 1
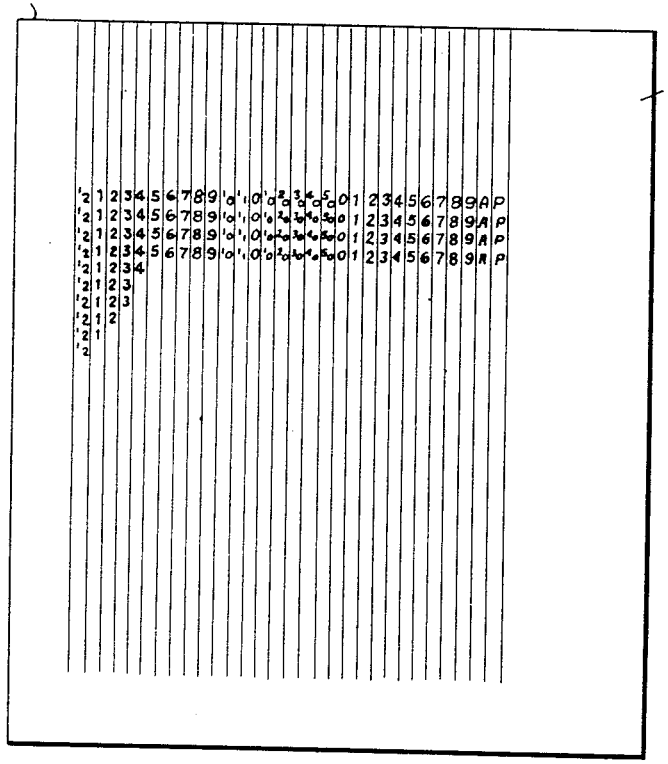
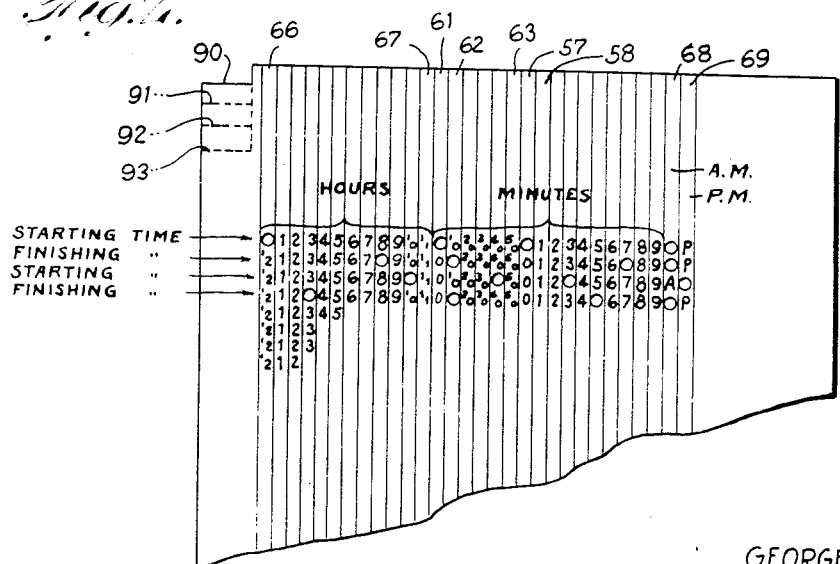
INVENTOR
GEORGE W. ODELL
BY
ATTORNEY Nov. 23, 1948.  G. W. ODELL  2,454,711
MEANS FOR USE IN COMPUTING ELAPSED TIME AND THE LIKE
Filed April 21, 1943  5 Sheets-Sheet 2

INVENTOR
GEORGE W. ODELL
BY
ATTORNEY

Nov. 23, 1948.  G. W. ODELL  2,454,711
MEANS FOR USE IN COMPUTING ELAPSED TIME AND THE LIKE
Filed April 21, 1943  5 Sheets-Sheet 4

INVENTOR
GEORGE W. ODELL
BY
ATTORNEY

Nov. 23, 1948.  G. W. ODELL  2,454,711
MEANS FOR USE IN COMPUTING ELAPSED TIME AND THE LIKE
Filed April 21, 1943  5 Sheets-Sheet 5
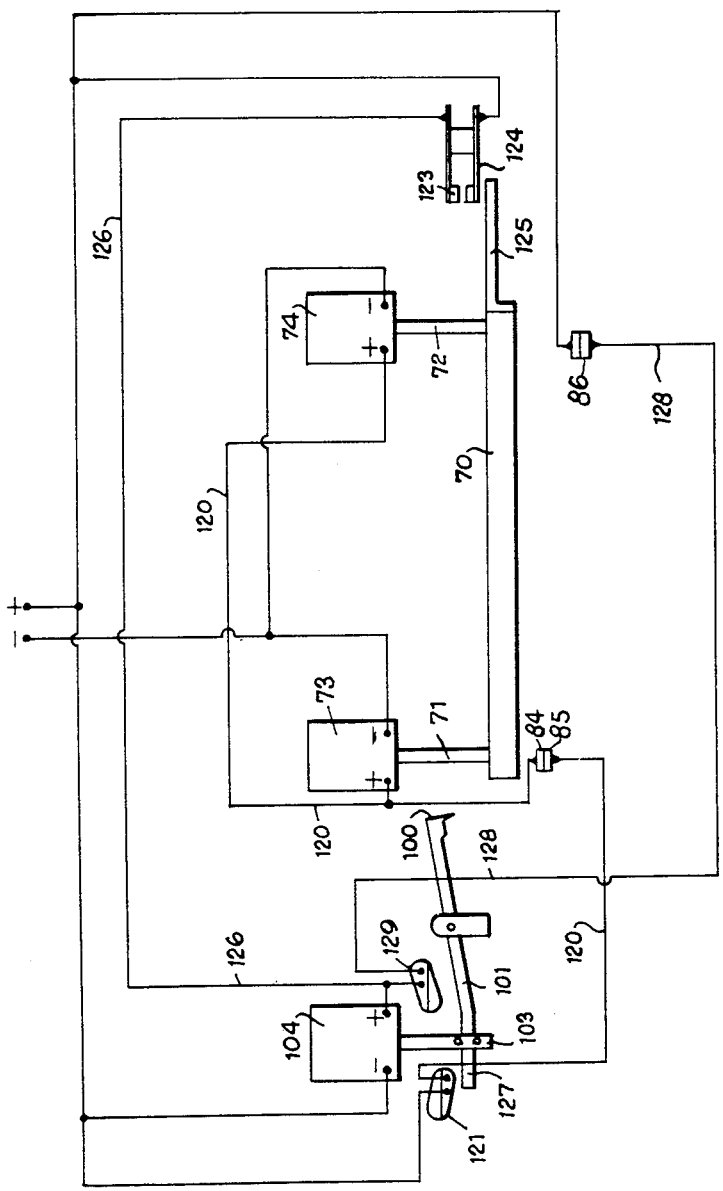
INVENTOR
GEORGE W. ODELL
BY
ATTORNEY Patented Nov. 23, 1948

2,454,711

UNITED STATES PATENT OFFICE 2,454,711

MEANS FOR USE IN COMPUTING ELAPSED TIME AND THE LIKE

George W. Odell, Rutherford, N. J.

Application April 21, 1943, Serial No. 483,913

7 Claims. (Cl. 346—104)

This invention relates, in general, to means for computing quantitative values such as, for one example, elapsed time. The ultimate purpose is to provide for registering the beginning and terminus of a succession of incremental changes in a mathematical progression, and for producing a pattern of the total of the succession that intervenes between the beginning and terminus.

More specifically, the invention as hereinafter illustrated relates to (a) the structure and functioning of an implement or combination of implements (exemplified by a perforated card) equipped with physically-operable elements (exemplified by alternating perforate and imperforate areas of the card) which represent incremental values at, respectively, the starting point and terminus of a succession of increments to be measured; and (b) mechanism for producing implements so equipped.

For purposes of illustration, the invention will be described as applied to the computation of elapsed time, as between the start and finish of a work-day, or during some other interval that is desired to be measured in units of time. In this illustration, the invention provides a card having paired groups of perforations, one of each pair representing a starting time, and the other representing a terminus time. The two paired groups have predetermined relationships in which they are coordinated in a physically-operable pattern that represents the numerical value of the progression (e. g. elapsed time) intervening between the start and terminus. The invention provides for the automatic production of the perforated card, to fabricate the pattern, under impulses from a clock mechanism.

One form of apparatus for the illustrative purposes is shown in the accompanying drawings in which:

Fig. 1 shows a printed card bearing symbols of units of time;

Fig. 2 shows the same card after four successive punching operations that have produced two paired groups of perforations;

Fig. 4a is a detached detail partly in section;

Fig. 8 is a wiring diagram of circuits used in the apparatus of Figs. 3 to 7.

Figure 3:
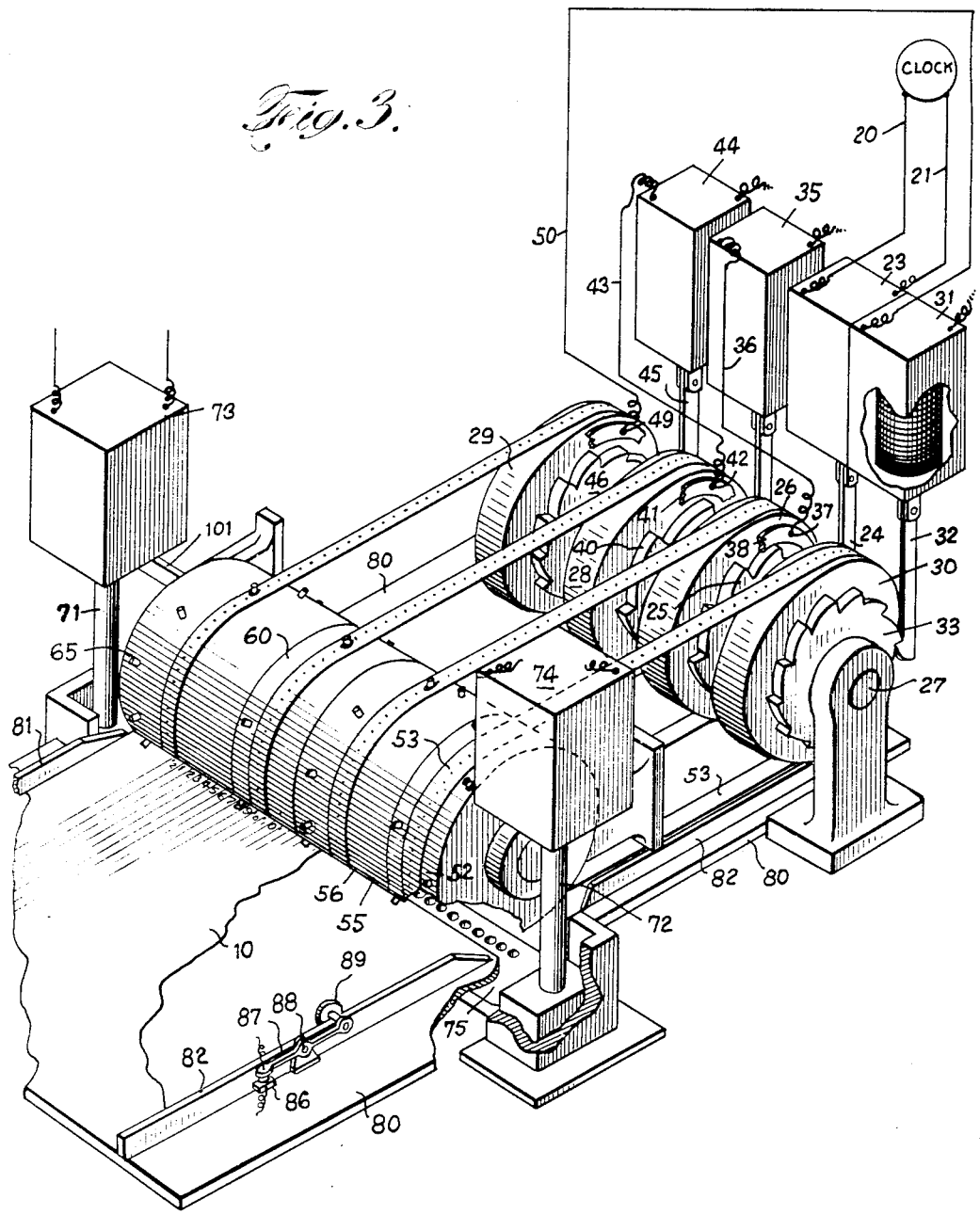
Fig. 3 is a diagrammatic perspective of a time-controlled punching mechanism.

In Fig. 1 the card 10 bears printed numerals which are correlated in horizontal and vertical series. Each horizontal series, reading from left to right, starts with 12 (the digit 1 being smaller and raised above the 2 to conserve space) which may represent either 12 A. M. (i. e. the start of a day) or 12 P. M. (noon). The following intervals from 1 to 11, inclusive, represent respectively the ordinals of eleven consecutive hours following the initial 12 o'clock (whether A. M. or P. M.). The zero following the 11 represents a point of time within an hour unit, at which fewer than ten minutes have elapsed since the beginning of the hour. The next series 10, 20, 30, 40, 50 represent respective units of ten minutes each. The following zero represents a point of time, within an hour unit, which does not include a number of minute units within the range of 1 to 9, inclusive: that is, the zero will be punched if (a) the point of time to be represented is exactly on the hour and does not comprise any minute units within the range 1 to 9; or (b) if the point of time to be represented comprises one or more hours plus minute units in the amount of 10 or a multiple thereof, but no minute units within the range of 1 to 9. For example, if 8:00 A. M., 8:20 or 8:50 A. M., is to be represented, the zero in question will be punched; but it will not be punched if the time to be represented is 8:05 A. M. or 8:26 or 8:57 A. M. or the like, in which case the 5 or 6 or 7 minute point would be punched in the next following series 1 to 9, inclusive, which represent consecutive minute units. The A and P in the scale respectively represent A. M. and P. M. The next series 1 to 9, inclusive respectively represent numbers of minutes. The A and P respectively represent A. M. and P. M.

The horizontal series just described is repeated as many times as desired, at uniformly spaced intervals, along the vertical length of the card in Fig. 1. When appropriately punched, the perforations in these series, beginning with the topmost, alternately represent starting and terminum times. The perforations are thus coordinated in pairs. Each pair is a physically-operable pattern that represents the elapsed time between the start and terminus. The pairs collectively are coordinated in a multiple pattern representing a cumulation of respective periods of elapsed time.

For instance (Fig. 2), the first or topmost horizontal series has four perforations which, from left to right, indicate in column 66, 12:00 o'clock; in column 61, no ten-minute units; in column 57, no minute units within the range 1 to 9; and in column 68, A. M. That is, the represented point of time is exactly 12:00 A. M. In the second series, the perforations indicate 8 o'clock; one ten-minute unit; a seven-minute unit; and A. M. That is, the terminus time was 8:17 A. M. The two groups of perforations supply the pattern of the elapsed time.

In the third series (Fig. 2) the perforations indicate 10 o'clock; a forty-minute unit; a three-minute unit; and P. M., that is, 10:43 P. M. was a starting time. The fourth series has perforations indicating 3 o'clock; a ten-minute unit; a five-minute unit; and A. M., i. e. the terminus was 3:15 A. M. The two groups of perforations in the third and fourth series supply a pattern of elapsed time. The coordination of the four series of perforations supplies a multiple pattern representing the cumulation of two periods of elapsed time.

The illustrative card may be printed, as described, to provide for any desired number of alternate starting and terminus times and those horizontal series which are perforated will represent points of time in hours and minutes. Other units of time, or of other incremental progressions, can be substituted for or included with hours and minutes. For example, each horizontal series in Figs. 1 and 2 could be supplemented by further groups to represent days, seconds or other units of time.

It is noteworthy that starting and terminus times are readily legible visually on the card in Fig. 2, after brief familiarity with the sequence and significance of the printed graduations. As already said, however, the perforated card is intended primarily to serve as an implement equipped with physically-operative elements in predetermined patterns which may control selectively the functioning of apparatus for automatically registering, recording, computing or the like. The card as shown combines the properties of a legible record from which elapsed intervals may be computed by cerebration, and a mechanical implement which may predetermine automatic operations. The printed symbols on the card are non-essential if the perforations are selected and punched automatically (as described below), and if the card-pattern is not to be read visually but is to operate as a control element of automatic equipment.

The card may be punched manually. Preferably, the opportunity for human error is eliminated by providing time-controlled automatic mechanism such as that illustrated in Figs. 2 to 7, inclusive.

The prime controller of the mechanism of Fig. 3 is a conventional electric clock from which leads 20, 21 connect with a solenoid 23 that is energized at intervals of one minute by the operation of the clock. Each time the solenoid 23 is energized its armature 24 is retracted upwardly (Fig. 3) to operate a pawl that engages a ten-tooth ratchet 25 fixed on the so-called "minute"-driving drum 26. The drum 26 is given one complete revolution in ten minutes, in intermittent steps each of which plus the period of rest, consumes one minute. As the end of each ten-minute revolution approaches, the movement of the drum 26 initiates the operation of another drum as presently described.

The drum 26 revolves on a fixed shaft 27 upon which are mounted also the "10-minute-unit" driving drum 28, the "hour" driving drum 29 and the "A. M.-P. M." driving drum 30. Each drum has fixed to it a ratchet, operated by a pawl that is activated by retraction of an armature of a solenoid. The typical arrangement of solenoid, pawl, ratchet and drum is exposed at the right of Fig. 3 in connection with the A. M. and P. M. driving drum. The solenoid 31 has suspended from its armature the pawl 32 engaging a tooth on the ratchet 33. Each time the solenoid is energized, its retracted armature lifts the pawl 32 the distance required to rotate the ratchet 33 through an angle equal to the pitch of one tooth. All the driving drums and their ratchets, pawls and solenoids, are similarly arranged. They differ in the periodicity of their movements and the angular units of their respective intermittent movements.

When the minute-driving drum 26 is about to complete one revolution, at the end of a ten-minute unit, it is caused to close the circuit that energizes the solenoid 35 of the 10-minute-driving drum 28. Similarly, when the 10-minute drum 28 is about to complete one revolution, at the end of a 60-minute unit, it is caused to energize the solenoid 44 of the hour drum 29. And when the hour drum is about to complete one revolution, at the end of a 12-hour unit, it is caused to energize the solenoid 31 of the A.M.-P. M. drum 30 to represent a transition from A. M. to P. M. or vice versa. A typical arrangement of parts for these purposes is shown in Fig. 4 in connection with the hour drum 29, as will be described in detail later.

In the circuit of the 10-minute solenoid 35 is a lead wire 36 to one side of a switch 37 mounted on an insulator ring 38 which encircles the shaft 27 and is held stationary by being bracketed to the bed-plate of the machine. The switch 37 is closed from time to time, to close the circuit of the solenoid 35, by a stud carried on the drum 26, corresponding to the stud on the drum 29, shown in Figs. 4 and 4a, and presently described. During most of the rotation of the drum 26 the circuit remains open and the solenoid 35 inactive, but when the stud on the drum arrives at the switch 37, the circuit is closed and the solenoid 35 is energized when the drum 26 is about to complete one revolution at the expiration of a ten-minute interval. Thereupon the solenoid 35 retracts its armature and pawl and revolves the drum 28 through one of its intermittent steps. The ratchet 40 fixed to the 10-minute drum 28 has six teeth of uniform pitch. Each time its solenoid 35 is energized, the 10-minute drum 28 is rotated through sixty degrees representing an expired 10-minute interval.

A stationary insulated ring 41 having a switch 42 is positioned adjacent the drum 28 which carries a stud, to close the switch 42 as the drum 28 approaches the completion of one revolution representing a 60-minute interval. This closes the circuit through the lead wire 43 to the hour solenoid 44. Its armature retracts a pawl 45 engaging a ratchet 46 fixed on the hours drum 29. The ratch 46 has twelve teeth of uniform pitch, and each time the solenoid 44 is energized the drum 29 is rotated through thirty degrees; and one complete revolution represents an interval of twelve hours.

Figure 4:
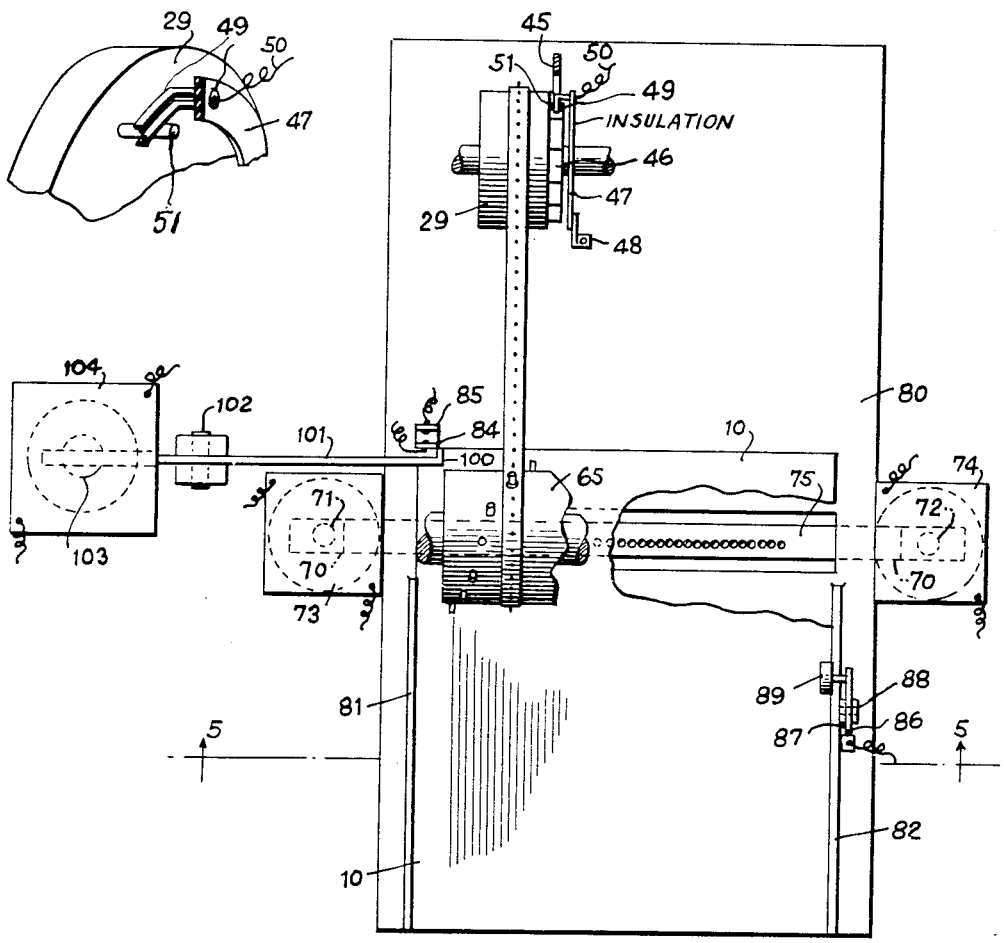
Fig. 4 is a plan view of part of the mechanism of Fig. 3 showing fragments of some of the elements.

As shown in Figs. 4 and 4a, a stationary insulator ring 47 is positioned adjacent the ratchet 46 of the drum 29 and is fixed on a bracket 48 on the bed-plate of the machine. The insulator ring 47 has a switch 49 in the circuit 50 of the A. M.-P. M.-solenoid 31. When the drum 29 is about to complete one revolution representing an interval of twelve hours, the stud 51 carried thereon closes the circuit 50 through the switch 49 and energizes the A. M.-P. M. solenoid 31 to represent a transition from A. M. to P. M., or vice versa. The arrangement of insulator ring 47, bracket 48, switch 49 and stud 51, as illustrated in Figs. 4 and 4a, is typical of similar arrangements related to the drums 26 and 28.

The ultimate purposes of the described driving drums 26, 28, 29 and 30 are to set automatically in proper relationship the punches which are to punch the cards to register respective time patterns as illustrated in Fig. 2. Each driving drum is connected to a driven punch-carrying drum by a sprocket belt or otherwise in such manner as will maintain accurately the relationship of each pair of driving and driven drums. As shown, the drum 30 is connected to the drum 52 by a belt 53 having throughout its length spaced perforations which engage corresponding studs in the respective drums. Similar belts and studs are provided for the other pairs.

The driven minute drum 55 carries ten punches 56 spaced uniformly 36 degrees apart circumferentially, and spaced axially in planes separated from each other a distance equal to that between median lines of the vertical columns on the card shown in Figs. 1 and 2. That is, the line of centres between two punches, projected on to an axial plane, is equal to the line of medians of the card columns, so that each punch when in punching position will register with a corresponding column on the card. For example, as viewed in Fig. 5, the punch at the extreme left on the drum 55, when in punching position will register with the column 57 on the card (Fig. 2) and will be in position to perforate a zero point. Then, when the drum 55 has been rotated through thirty-six degrees (contra-clockwise in Fig. 3), a second punch will be brought into punching position in registry with column 58 (Fig. 2) and so on through the series from zero to 9 and then to zero again.

The 10-minute-unit punch drum 60 carries six punches spaced sixty degrees apart circumferentially, and spaced axially in the same way as on the drum 55, i. e., to register with the 10-minute-unit columns 61, 62, etc., to column 63 in Fig. 2.

The hours punch drum 65 carries twelve punches spaced apart thirty degrees circumferentially, and separated axially, as in the other cases, to register respectively with the hours columns 66 to 67, inclusive, in Fig. 2. The A. M.-P. M. drum 52 carries twelve punches spaced at thirty degree intervals circumferentially and alternating to register one with the A. M. column 68 and the next with the P. M. column 69 (Fig. 2).

Thus, assuming a starting time at 12 A. M. the punches then in punching position, (viewed from the left in Fig. 3) would be as follows: the punch at the extreme left of the series on drum 65; the punch at the extreme left on drum 60; the punch at the extreme left on the drum 55; and one of the punches of the left-hand series on drum 52. So adjusted, the punches would produce the perforations shown in the topmost series in Fig. 2. Thereafter with the passage of each additional minute, and each ten-minute interval and each hour interval and each twelve-hour interval, the clock-controlled movement of the punch drums will present in punching position the respective punches to perforate the appropriate columns in the card.

In the punching operation the acting punches project downwardly in the vertical axial planes of their drums. They remain stationary while the card is pushed upwardly to perforate it. For this purpose a vertically reciprocable crosshead 70 (Fig. 5) is provided, suspended from the armatures 71, 72 of two solenoids 73, 74. The crosshead 70 is channeled at 75 and the top of the channel is covered by a platen 76 which supports the card. The platen has thirty apertures, corresponding to the total of the punching positions that may be occupied by the punches. Each aperture in the platen registers accurately with a corresponding punch when presented in punching position. Slugs punched out of the cards are pushed through the apertures of the platen into the channel 75. The crosshead 70 slides vertically between upstanding guides 77 and 78 mounted on the bed-plate of the machine. The control of the solenoids 73 and 74, for vertically reciprocating the crosshead 70 and platen 76, will be described presently. Adjoining the platen 76, at opposite sides thereof, are stationary tables 79 and 80 (Fig. 5) having vertical guide-flanges 81, 82 spaced apart to guide the card accurately as it is moved endwise (i. e., parallel with its vertical columns in Fig. 1) on being inserted into the machine. The guide-flanges 81 and 82 serve to position the card transversely so that its columns shall register precisely with the punching positions of the respective punches.

When a card 10 is first introduced it encounters a switch 86 (Figs. 4 and 7) which is held closed so long as the card remains in the apparatus—for purposes later explained.

When a card is inserted for punching the first group of perforations, to represent a starting time; the advance edge of the card, at the upper left-hand corner 83 of the card in Fig. 1 encounters a gauge 84 (Figs. 4, 5 and 6) which is one member of a switch and is flexibly mounted so that the final setting of the card in position forces the gauge 84 toward the other switch-member 85 and to close the swtich. When the switch is thus closed, the card is then positioned so that its first transverse series of printed numerals is located accurately at the punching station and the circuit through the switch 84, 85 is closed and a punching operation ensues.

Simultaneously with the initial punching operation on a card, a cutter severs a piece from the gauging corner 83 of the card as shown in Fig. 2. The depth of the cut (measured vertically in Fig. 2) is equal to the line of medians between the first and second series of imprints on the card. The result is that when the card is inserted for the next ensuing punching operation, the gauging edge 90 will encounter the gauge 84 and close the switch 84, 85 when the second series of imprints has arrived at the punching station. When the second series of perforations is punched, the cutter severs another part of the card to produce a new gauging edge 91, and thereafter each punching operation is accompanied by a cutter action to produce successive gauging edges 92, 93 etc. corresponding to the successive punching stations of the series of imprints on the card.

For these purposes a knife 100 having a right-angled blade is provided, mounted at one end of a lever 101 pivoted at 102 and having its other end engaged at the armature 103 of the solenoid 104. When the latter is energized the lever 101 is rocked clockwise to dotted line position in Fig. 5 to sever the advance margin of the card as indicated in Fig. 2. Each punching operation is accompanied by a similar cut to cause the gauging edge of the card to retreat to the successive points as illustrated in Fig. 2.

The wiring diagram for the above-described apparatus is shown in Fig. 8. When a card is inserted in the punching machine (Figs. 3, 4, 5 and 7) it closes the switch 86 which has no immediate function but at a later stage, after a single punching operation, prevents a repetition of the punching until the card has been withdrawn, as will appear more readily when other circuits have been described. The switch 86 (Fig. 7), has a lower contact point mounted on the table 80, and an oscillating point mounted at one end of a lever 87 pivoted at 88 and having at its other end a roller 89 which serves as a counterweight, normally (in the absence of a card) holding the lever 87 in position to keep open the switch 86. When a card is inserted, and so long as it remains in proximity to the punches, the roller 89 is lifted enough to hold the lever 87 in position to keep the switch 86 closed.

When the card has been adjusted to its punching station, with its front edge closing the switch 84, 85, this closes the circuit which energizes the solenoids 73 and 74 which retract their armatures 71, 72 and the crosshead 70 and platen 76 to effectuate a punching operation. That circuit is shown at 120 in Fig. 8 connected from one side of the switch 84, 85 with the windings of the solenoids 73, 74; and from the other side of the switch 84, 85 passing through a tilting mercury switch 121 which is normally closed so that the circuit is initially closed by the switch 84, 85. That is, the closing of the switch 84, 85 causes one punching operation.

Figure 5:
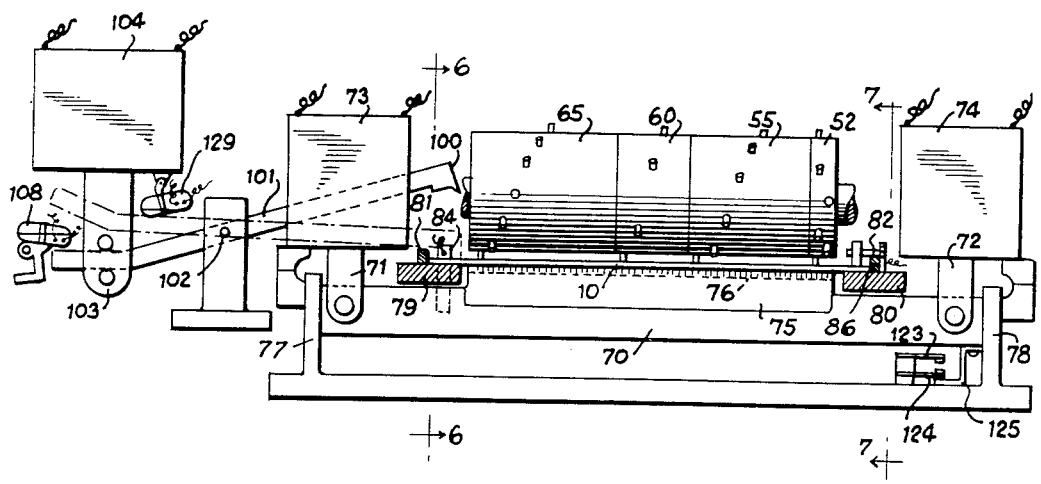
Fig. 5 is an end elevation, partly in section on the line 5—5 of Fig. 4, viewed from left to right in Fig. 3 and from bottom to top in Fig. 4.
Figure 6:
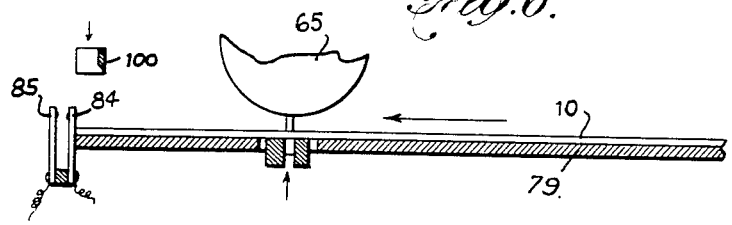
Fig. 6 is a detail section on the line 6—6 of Fig. 5.
Figure 7:
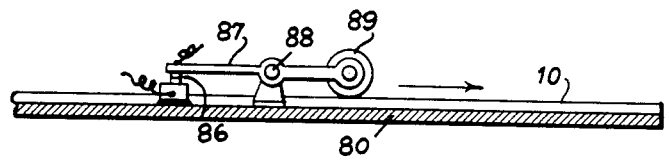
Fig. 7 is a detail section on the line 7—7 of Fig. 5.

The primary control of the cutter solenoid 104 is by a switch best shown in Fig. 5 which comprises an upper point 123 and a lower point 124 spring-mounted on the base plate. A bracket 125 fixed to the crosshead 70 to reciprocate with it, has a flange projecting beneath the point 124. When the crosshead 70 moves upwardly the bracket 125 closes the switch 123, 124 and closes the circuit 126 through the solenoid 104 which causes a cutter operation by rocking the cutting lever 101 clockwise. In that movement the rear end 127 of the cutter lever tilts the mercury switch 108 and opens it so as to break the circuit 120 (through the punching solenoids 73, 74) and to permit the crosshead 70, platen 76 and the punched card to descend away from the punches. That movement opens the switch 123, 124 and breaks the circuit 126 through the cutter solenoid 104. That would rock the cutter lever 101 contra-clockwise from its cutting position, except that a secondary circuit is closed to keep the cutter solenoid 104 energized so as to hold the cutter in cutting position, and also to keep open the punching circuit 120 at the switch 121, for so long as the card remains in proximity to the punching station.

This secondary circuit 128 for the solenoid 104 passes from one side of the switch 86 and through a mercury switch 129 (Fig. 5) which is closed by the cutting movement of the lever 101 so that the solenoid 104 is kept energized until the card has been removed and permitted the switch 86 to open. At the same time, maintaining the cutter lever 101 in cutting position keeps the mercury switch 121 open and prevents the closing of the punching circuit 120 until the card has been withdrawn and the switch 86 open. On withdrawing the card the switch 86 breaks the circuit 128 which has kept energized the solenoid 104. As its armature descends, it rocks the cutter lever 101 contra-clockwise, the switch 121 tilts to closed position restoring that part of the punching circuit 120; and permitting the switch 129 to tilt to open position and keep open the circuit 128 until the next insertion of a card and until the next cutter operation recloses the switch 129. With the described arrangement, it is impossible to perform more than a single punching operation for each insertion of a card, because the card must be completely withdrawn past the switch 86 following one punching operation before a second can occur.

In the appended claims "physically-operable" signifies: capable of being operated in the performance of a physical function (e. g., mechanically, electrically, pneumatically, or otherwise).

I claim as my invention:

1. Apparatus for producing a pattern of the numerical value, in terms of hours and minutes, of time elapsed between a starting time and a finishing time that occur within any 24-hour period, comprising, in combination, a series of thirty punches disposed in a straight line and representing collectively all of a system of subdivisions of hours and minutes in A. M. and P. M. of a 24-hour period, the punches being arranged in groups representing respectively (a) the ordinals of twelve consecutive hours, (b) a point of time within an hour at which less than ten minutes have elapsed since the beginning of the hour, (c) the ordinals of five consecutive ten-minute units, (d) a point of time within an hour which does not include minute units within the range of 1 to 9, inclusive, (e) the ordinals of 9 consecutive minutes, and (f) A. M. and P. M., whereby a selection of four punches including the A. M. or P. M. punch may represent in hours and minutes any point of time within any 24-hour period commencing in A. M. or P. M.; adjustable supports for the respective said groups of punches permitting four punches selected from respective groups to be operatively coordinated at a punching station to represent thereat a point of time in hours and minutes in A. M. or P. M.; clock mechanism delivering energy impulses at the rate of one each minute; setting-means interposed between the clock mechanism and the punch supports, transmitting impulses from the former to adjust the latter progressively by increments corresponding to one minute each, to position punches at the punching station in successive coordinations representing consecutive points of time syncronized with the clock mechanism; the relative positions of the punches in each sucn coordination designating a point of time in hours and minutes in A. M. or P. M.; means for supporting a card at the punching station to be perforated by the punches in any such coordination, having positioning means determining an initial location of the card at the punching station, and a second location of the card, at the same punching station, spaced from an in alignment with the initial location; and punch-operating means to cause successive coordinations of punches to perforate the card at said initial and second locations at the punching station: whereby the clock controlled punching operations produce two coordinated, rectilinear, parallel, spaced groups of perforations in the card that are physically operable patterns, severally of the numbers of hours and minutes at separated points of time and the occurrence of each in A. M. or P. M., and collectively of the elapsed hours and minutes between said points of time within any 24-hour period.

2. Apparatus for producing a pattern of the numerical value, in terms of hours and minutes, of time elapsed between a starting time and a finishing time within any 24-hour period, comprising, in combination, a series of punches representing collectively all of a system of subdivisions of hours and minutes in A. M. and P. M. of a 24-hour period, the punches comprising groups representing respectively the ordinals of twelve consecutive hours, the ordinals of consecutive ten-minute units, the ordinals of consecutive minutes less than 10, and A. M. and P. M., whereby a selection of punches including the A. M. or P. M. punch may represent in hours and minutes a point of time within any 24-hour period commencing in A. M. or P. M.; adjustable supports for the respective said groups of punches permitting punches selected from respective groups to be operatively coordinated at a punching station to represent thereat a point of time in hours and minutes in A. M. or P. M.; clock mechanism delivering energy impulses at the rate of one each minute; setting-means interposed between the clock mechanism and the punch supports, transmitting impulses from the former to adjust the latter progressively by increments corresponding to one minute each, to position punches at the punching station in successive coordinations representing consecutive points of time syncronized with the clock mechanism, the relative positions of the punches in each such coordination designating a point of time in hours and minutes in A. M. or P. M.; means for supporting a card at the punching station to be perforated by the punches in any such coordination, having positioning means determining an initial location of the card at the punching station, and a second location of the card at the same punching station in predetermined relation to the initial location; and punch-operating means to cause successive coordinations of punches to perforate the card at said initial and second locations at the punching station; whereby the clock controlling punching operations produce two coordinated groups of perforations in the card that are physically operable patterns, severally of the numbers of hours and minutes at separated points of time and the occurrence of each in A. M. or P. M., and collectively of the elapsed hours and minutes between said points of time within any 24-hour period.

3. Apparatus for producing a pattern of the numerical value, in terms of hours and minutes, of time elapsed between a starting time and a finishing time within a 24-hour period, comprising, in combination, variable pattern-forming means representing collectively all of a system of subdivision of hours and minutes in A. M. and P. M. of a 24-hour period, and representing severally ordinals of consecutive hours, of consecutive ten-minute units, and of consecutive minutes less than 10, and A. M. and P. M., said means being adjustable whereby a selection of said means may be coordinated to represent in hours and minutes respective points of time within a 24-hour period; adjusting mechanism delivering energy impulses at a uniform rate per unit of time; means transmitting said impulses to adjust the pattern-forming means, progressively by increments corresponding to successive units of time, into positions at a pattern-forming station, in successive coordinations representing consecutive points of time; means for presenting a pattern-receiving medium at said station; and operating means to cause selected coordinations of pattern-forming means to form on said medium patterns of respective points of time, correlated in a physically-operable pattern of the numerical value of time elapsed between said respective points.

4. Apparatus for producing a pattern of the numerical value of time elapsed between a starting time and a finishing time within a 24-hour period, comprising, in combination, variable pattern-forming means representing collectively a system of subdivisions of units of time in a 24-hour period, and representing severally ordinals of consecutive units of time, said means being adjustable whereby a selection of said means may be coordinated to represent respective points of time within a 24-hour period; adjusting mechanism delivering energy impulses at a uniform rate per unit of time; means transmitting said impulses to adjust the pattern-forming means, progressively by increments corresponding to successive units of time, into positions at a pattern-forming station, in successive coordinations representing consecutive points of time; means for presenting a pattern-receiving medium at said station; and operating means to cause selected coordinations of pattern-forming means to form on said medium patterns of respective points of time, correlated in a physically-operable pattern of the numerical value of time elapsed between said respective points.

5. Apparatus for producing a pattern of the numerical value of time elapsed between a starting time and a finishing time within a 24-hour period, comprising, in combination, variable pattern-forming means representing collectively a system of subdivisions of units of time in a 24-hour period, and representing severally ordinals of consecutive units of time, said means being adjustable whereby a selection of said means may be coordinated to represent respective points of time within any 24-hour period; adjusting mechanism to adjust the pattern-forming means, progressively by increments corresponding to successive units of time, into positions at a pattern-forming station, in successive coordinations representing consecutive points of time; means for presenting a pattern-receiving medium at said station; and operating means to cause selected coordinations of pattern-forming means to form on said medium plural patterns of respective points of time, correlated in a physically-operable pattern of the numerical value of time elapsed between said respective points.

6. Apparatus for producing a pattern of the numerical value of an interval in an incremental progression comprising, in combination, pattern-forming means representing collectively the numerical values of successive stages in said progression, said means being adjustable whereby a selection of said means may be coordinated to represent respective stages in said progression; adjusting means providing a succession of impulses correponding to the increments in said progression; means transmitting said impulses to adjust the pattern-forming means progressively into positions at a pattern-forming station, in successive coordinations representing consecutive stages in said progression; means for presenting a pattern-receiving medium at said station; and operating means to cause selected coordinations of pattern-forming means to form on said medium patterns of respective stages in said progression, correlated in a physically-operable pattern of the numerical value of the differential between said stages.

7. Apparatus for producing a pattern of the numerical value of an interval in an incremental progression comprising, in combination, pattern-forming means representing collectively the numerical values of successive stages in said progression, said means being adjustable whereby a selection of said means may be coordinated to represent respective stages in said progression; adjusting means to adjust the pattern-forming means progressively into positions at a pattern-forming station, in successive coordinations representing consecutive stages in said progression; means for presenting a pattern-receiving medium at said station; and operating means to cause selected coordinations of pattern-forming means to form on said medium patterns of respective stages in said progression, correlated in a physically-operable pattern of the numerical value of the differential between said stages.

GEORGE W. ODELL.

REFERENCES CITED

The following references are of record in the file of this patent:

UNITED STATES PATENTS

| Number | Name | Date |
|---|---|---|
| Re. 14,915 | Peirce | July 13, 1920 |
| 834,365 | Darlington | Oct. 30, 1906 |
| 1,208,119 | Ficker | Dec. 12, 1916 |
| 1,421,824 | Odell | July 4, 1922 |
| 1,473,554 | Hill | Nov. 6, 1923 |
| 1,582,333 | Bryce | Apr. 27, 1926 |
| 1,772,492 | Lake | Aug. 12, 1930 |
| 1,773,421 | Bryce | Aug. 19, 1930 |
| 1,965,969 | Sturtevant | July 10, 1934 |
| 2,013,530 | Wells | Sept. 3, 1935 |
| 2,171,167 | Streckfuss | Aug. 29, 1939 |
| 2,206,206 | Smith | July 2, 1940 |
| 2,213,573 | Von Pein et al. | Sept. 3, 1940 |
| 2,294,739 | Connoly | Sept. 1, 1942 |
| 2,307,128 | Harrison | Jan. 5, 1943 |
| 2,312,137 | Watson | Feb. 23, 1943 |